US012434210B2

(12) United States Patent
Hulinsky et al.

(10) Patent No.: US 12,434,210 B2
(45) Date of Patent: Oct. 7, 2025

(54) ADMIXING SYSTEM FOR FIRE EXTINGUISHING SYSTEMS AND METHOD FOR OPERATING SUCH AN ADMIXING SYSTEM

(71) Applicant: FIREDOS GMBH, Wölfersheim (DE)

(72) Inventors: Andreas Hulinsky, Dresden (DE); Fritz Zimmermann, Gerstetten (DE)

(73) Assignee: FireDos GmbH, Wölfersheim (DE)

( * ) Notice: Subject to any disclaimer, the term of this patent is extended or adjusted under 35 U.S.C. 154(b) by 729 days.

(21) Appl. No.: 17/767,327

(22) PCT Filed: Oct. 2, 2020

(86) PCT No.: PCT/EP2020/077617
§ 371 (c)(1),
(2) Date: Apr. 7, 2022

(87) PCT Pub. No.: WO2021/069313
PCT Pub. Date: Apr. 15, 2021

(65) Prior Publication Data

US 2022/0362595 A1 Nov. 17, 2022

(30) Foreign Application Priority Data

Oct. 8, 2019 (DE) ......................... 102019215406.9

(51) Int. Cl.
*B01F 35/83* (2022.01)
*A62C 5/00* (2006.01)
(Continued)

(52) U.S. Cl.
CPC ............ *B01F 35/831* (2022.01); *A62C 5/002* (2013.01); *A62C 5/02* (2013.01); *B01F 23/451* (2022.01);
(Continued)

(58) Field of Classification Search
CPC .. B01F 23/451; B01F 35/831; B01F 35/8311; B01F 35/833; A62C 5/002; F04D 13/04; B05B 12/1436
See application file for complete search history.

(56) References Cited

U.S. PATENT DOCUMENTS 1,795,749 A 3/1931 Winters
2,347,944 A 5/1944 Fowler
(Continued)

FOREIGN PATENT DOCUMENTS

CN 85105455 1/1987
CN 205626812 10/2016
(Continued)

OTHER PUBLICATIONS

Official Action for China Patent Application No. 202080070136.3, dated Dec. 1, 2022, 6 pages.
(Continued)

*Primary Examiner* — Atif H Chaudry
(74) *Attorney, Agent, or Firm* — Sheridan Ross PC

(57) ABSTRACT

A admixing system for fire extinguishing systems for producing an extinguishing agent-extinguishing agent additive mixture (premix) by mixing an extinguishing agent additive with an extinguishing agent. The admixing system has a motor that can be driven by a flow of extinguishing agent, an admixing pump connected to the motor for pumping the extinguishing agent additive, an admixing line, and an extinguishing agent additive line, from which the extinguishing agent additive is mixed with the extinguishing agent in the admixing line. The admixing system has a branching line, from which a part of the flow of extinguishing agent can be branched off if the load in the fire extinguishing system only requires a small flow of extinguishing agent. In this manner, the flow of extinguishing agent flowing through the motor is artificially increased so
(Continued)

that the motor runs in a higher rotational speed range in which a reliable operation of the motor is ensured (a so-called start-up flow reduction). The admixing system has a motor rotational speed measuring device and a controller, said controller being designed to completely or partly open and/or close the branching valve on the basis of the motor rotational speed measured by the motor rotational speed measuring device.

9 Claims, 1 Drawing Sheet

(51) Int. Cl.

| | |
|---|---|
| ***A62C 5/02*** | (2006.01) |
| ***B01F 23/40*** | (2022.01) |
| ***B01F 23/451*** | (2022.01) |
| ***B05B 12/14*** | (2006.01) |
| ***F04D 13/04*** | (2006.01) |

(52) U.S. Cl.
CPC .......... *B01F 23/49* (2022.01); *B01F 35/8311* (2022.01); *B05B 12/1436* (2013.01); *F04D 13/04* (2013.01)

(56) References Cited

U.S. PATENT DOCUMENTS

| | | | |
|---|---|---|---|
| 2,491,351 A | 12/1949 | Zeitllin | |
| 3,814,547 A | 6/1974 | Kitrilakis et al. | |
| 3,903,968 A * | 9/1975 | Livingston | A62C 5/002 169/14 |
| 4,257,440 A | 3/1981 | Hunter | |
| 4,436,487 A | 3/1984 | Purvis | |
| 4,645,009 A | 2/1987 | Hawelka et al. | |
| 4,830,589 A | 5/1989 | Pareja | |
| 4,859,157 A * | 8/1989 | Adler | B01F 27/50 417/406 |
| 4,899,825 A * | 2/1990 | Bosoni | B01F 25/31114 169/5 |
| 5,174,383 A | 12/1992 | Haugen | |
| 5,402,569 A | 4/1995 | Maki et al. | |
| 5,979,564 A | 11/1999 | Crabtree | |
| 6,009,953 A | 1/2000 | Laskaris et al. | |
| 6,074,176 A | 6/2000 | Conkin | |
| 6,684,959 B1 | 2/2004 | Juidici et al. | |
| 6,725,940 B1 | 4/2004 | Klein | |
| 7,563,076 B2 | 7/2009 | Brunet | |
| 2003/0196703 A1 | 10/2003 | Decler et al. | |
| 2004/0050556 A1 | 3/2004 | Baker | |
| 2005/0023006 A1 | 2/2005 | Vonhof | |
| 2007/0209807 A1 | 9/2007 | Kruger | |
| 2010/0193201 A1 | 8/2010 | Zeller | |
| 2011/0056707 A1 | 3/2011 | Gamble et al. | |
| 2013/0048099 A1 | 2/2013 | Crabtree | |
| 2013/0253711 A1 | 9/2013 | McLoughlin et al. | |
| 2018/0272164 A1 | 9/2018 | Knight | |
| 2019/0168047 A1 | 6/2019 | Conboy | |
| 2019/0219051 A1 | 7/2019 | Kraige et al. | |
| 2019/0374800 A1* | 12/2019 | Sivertsen | B01F 25/31113 |
| 2020/0230450 A1 | 7/2020 | Jonker | |
| 2022/0072351 A1 | 3/2022 | Jungmair | |
| 2025/0065167 A1 | 2/2025 | Schlepp | |
| 2025/0065168 A1 | 2/2025 | Schlepp | |
| 2025/0065169 A1 | 2/2025 | Schlepp | |

FOREIGN PATENT DOCUMENTS

| | | |
|---|---|---|
| CN | 106468252 | 3/2017 |
| CN | 107349545 | 11/2017 |
| CN | 107376177 | 11/2017 |
| CN | 207970383 | 10/2018 |
| CN | 109513140 | 3/2019 |
| CN | 208871102 | 5/2019 |
| DE | 806184 | 6/1951 |
| DE | 3131522 | 4/1983 |
| DE | 3503788 | 2/1986 |
| DE | 3812794 | 10/1989 |
| DE | 4227037 | 2/1994 |
| DE | 102008059638 | 6/2010 |
| DE | 102019215406 | 4/2021 |
| EP | 0296652 | 12/1988 |
| EP | 0647458 | 4/1995 |
| EP | 1595579 | 4/2010 |
| EP | 3292886 | 3/2018 |
| GB | 196608 | 2/1924 |
| GB | 731102 | 6/1955 |
| IT | MI20091679 | 4/2011 |
| KR | 20-0378222 | 3/2005 |
| KR | 10-2018-0052462 | 5/2018 |
| RU | 2257527 | 7/2005 |
| RU | 2431061 | 10/2011 |
| RU | 2530059 | 10/2014 |
| RU | 195411 | 1/2020 |
| SU | 41351 | 1/1935 |
| WO | WO 2006/000177 | 1/2006 |
| WO | WO 2006/119923 | 11/2006 |
| WO | WO 2016/048136 | 3/2016 |
| WO | WO 2017/123957 | 7/2017 |
| WO | WO 2018/077811 | 5/2018 |

OTHER PUBLICATIONS

Gao Jiaquan “The Structure and Overhaul of Automobile Engine,” Beijing Institute of Technology Press, Jul. 2013, p. 153.
Official Action with English Translation for Russia Patent Application No. 2022111971, dated Dec. 27, 2022, 21 pages.
International Search Report and Written Opinion for International (PCT) Patent Application No. PCT/EP2020/077617, dated Jan. 25, 2021, 11 pages.
English Translation of the International Search Report for International (PCT) Patent Application No. PCT/EP2020/077617, dated Jan. 25, 2021, 2 pages.
U.S. Appl. No. 17/762,229, filed Mar. 21, 2022, Schlepp.
U.S. Appl. No. 17/767,310, filed Apr. 7, 2022, Hulinsky et al.
D Roos “Data Sheet Proportioner FD20000 for Stationary Extinguishing Systems,” FireDos GmbH, Sep. 2018, 4 pages [retrieved online Jan. 13, 2021 from: www.firedos.com/downloads/en/DATA-SHEET-FireDos_FD20000-stationary.pdf].

* cited by examiner

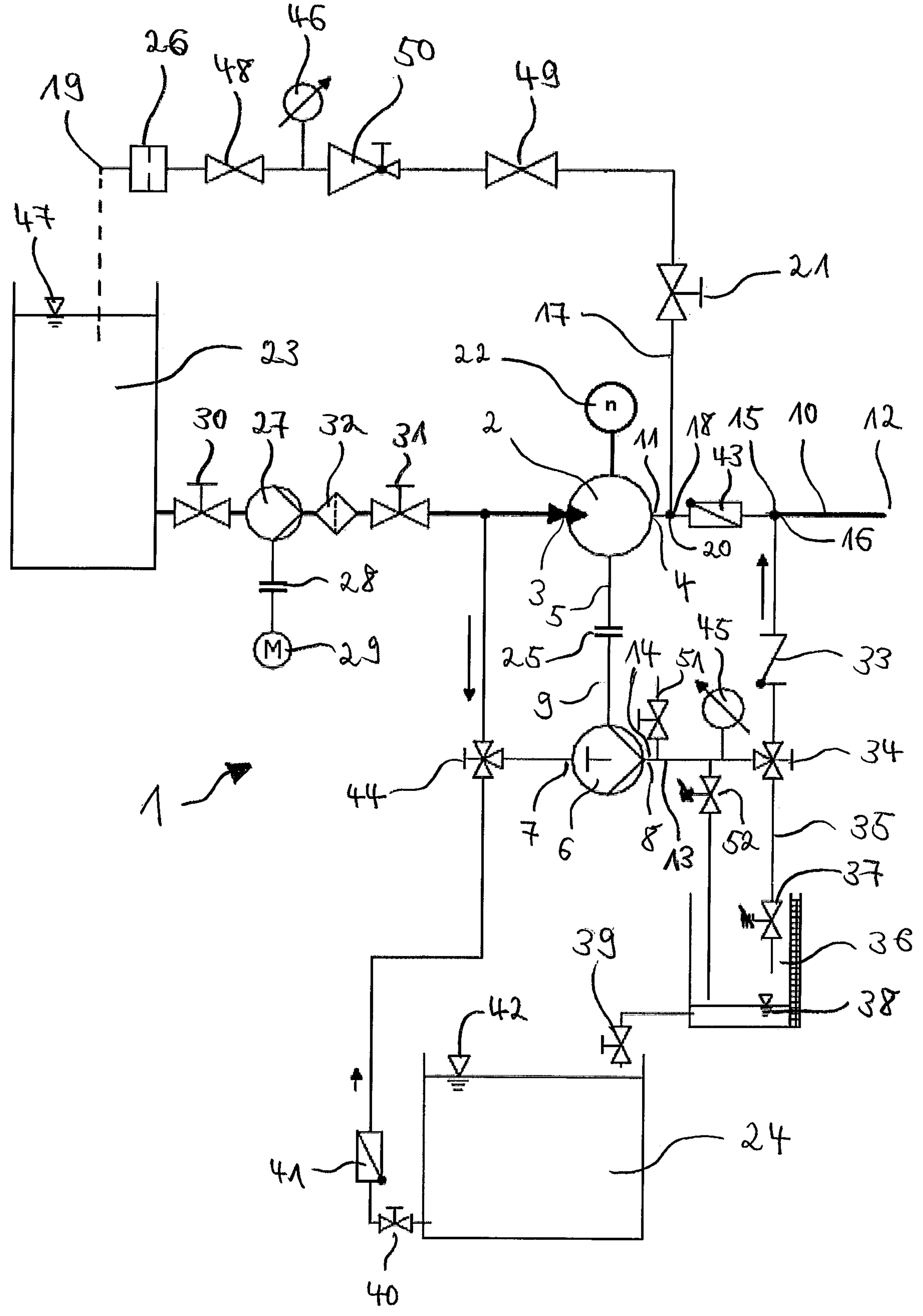
19
26
48
46
50
49
47
21
17
23
22
30
27
32
31
2
11
18
15
43
10
12
20
16
28
3
4
5
29
45
25
14
51
33
9
44
34
1
7
6
8
13
52
35
37
39
36
38
42
24
41
40

ADMIXING SYSTEM FOR FIRE EXTINGUISHING SYSTEMS AND METHOD FOR OPERATING SUCH AN ADMIXING SYSTEM

CROSS REFERENCE TO RELATED APPLICATIONS

This application is a national stage application under 35 U.S.C. 371 and claims the benefit of PCT Application No. PCT/EP2020/077617 having an international filing date of 2 Oct. 2020, which designated the United States, which PCT application claimed the benefit of German Patent Application No. 102019215406.9 filed 8 Oct. 2019, the disclosures of each of which are incorporated herein by reference in their entireties.

The present invention relates to an admixing system for fire extinguishing systems. A fire extinguishing system in the sense of the present invention is a system comprising a pump, a system of lines, and a foaming agent admixing system by means of which an extinguishing agent can be discharged, particularly through nozzles, foam tubes or foam generators. The fire extinguishing system can be a stationary system such as a fire extinguishing system in a tank farm with a permanently installed so-called monitor; i.e. a large jet nozzle, or even a permanently mounted sprinkler system in a building. It can however also be a portable system on a vehicle or a roll-on/roll-off container.

Such fire extinguishing systems are usually operated with water as the extinguishing agent. Yet it is advantageous in many cases for the extinguishing agent to be foamed before it being deployed onto the fire to be fought so that the discharged extinguishing agent forms a long-lasting blanket of extinguishing agent able to smother the fire. To that end, an extinguishing agent additive, a foaming agent in this case, is usually initially mixed into the extinguishing agent at a specific rate. The mixture of extinguishing agent/extinguishing agent additive (the so-called "premix") is then foamed in a nozzle under a feed of air and discharged onto the fire to be extinguished. The volumetric ratio of extinguishing agent additive to extinguishing agent, the so-called admixture rate, is typically between 0.5% and 6%.

Another extinguishing agent additive able to be mixed with the extinguishing agent is a surfactant or "wetting agent" which reduces the surface tension of the extinguishing agent, in particular the extinguishing water. This is advantageous when fighting forest fires, for example, because the extinguishing water can thereby bathe larger areas, particularly on the leaves of trees, and can thus be used more efficiently. Furthermore, due to the reduced surface tension, the extinguishing water can penetrate deeper into the forest soil in order to extinguish deeper hotspots, for example.

There are also foaming agents likewise able to be used as wetting agents (potentially at other admixture rates, particularly at a minimum admixture rate of 0.1%).

The invention will to some extent be described in the following using the example of water as an extinguishing agent and foaming agent as an extinguishing agent additive. However, this is not to be understood as being limiting. The invention can just as equally be used in the admixture of any extinguishing agent additives to any extinguishing agents.

For operation of the fire extinguishing system with the admixing system, both the extinguishing agent as well as the extinguishing agent additive can be provided in an extinguishing agent tank, or an extinguishing agent additive tank respectively, or also provided via an extinguishing agent supply line or extinguishing agent additive supply line respectively. Further necessitated when the extinguishing agent is provided in an extinguishing agent tank is an extinguishing agent pump which pumps the extinguishing agent out of the extinguishing agent tank, pressurizes it and feeds it to the admixing system. However, the just mentioned components are not part of the admixing system itself.

When the extinguishing agent additive is a foaming agent, the mixture of extinguishing agent and extinguishing agent additive to be produced; i.e. the premix, is then directed as a premix flow through a foaming nozzle in which ambient air is drawn in through the premix flow and mixed with the premix. This activates the foaming agent in the premix and foams the premix such that an extinguishing agent foam can be discharged from the foaming nozzle and deployed onto the fire.

The air needed to foam the foaming agent can also be supplied to the premix in the form of compressed air. Such a system generating compressed air foam is referred to as a CAFS system (compressed air foam system).

Although it is possible for the premix to be produced in advance independently of the fire extinguishing system, it might then need to be stored for a longer period of time. Thus, in many cases, it is more advantageous to not produce the premix until right before the extinguishing agent being applied to the fire to be fought. The admixing system has an admixing pump for this purpose, via which the extinguishing agent additive can be conveyed and added into the extinguishing agent.

In the admixing system relative to the present invention, the admixing pump is driven by a motor which is in turn driven by a flow of the extinguishing agent itself.

In the above-cited, non-limiting example of invention application, the admixing system thus comprises a water motor driven by the extinguishing water flow. The output shaft of the water motor is coupled to the input shaft of the admixing pump to that end, for example by means of a clutch.

The extinguishing agent additive conveyed by the admixing pump is then directed through an extinguishing agent additive line from the admixing pump into an admixing line and mixed into the flow of extinguishing agent there in order to produce the premix.

This configuration of the admixing system, in which the admixing pump is driven by the already present flow of extinguishing agent, has the advantage of the admixing pump not needing any external operating energy, particularly electricity, whereby the admixing system is extremely fail-safe. Furthermore, the output capacity of the admixing pump is substantially proportional to the speed of the motor, which is in turn substantially proportional to the flow rate of the extinguishing agent flow. A substantially constant admixture rate is thereby automatically achieved without the need for further control or regulating devices.

A technical property of water motors is that they only work reliably as of a certain minimum flow rate to the water flow which drives them. If the driving flow of water fails to reach this minimum flow rate, the water motor will only yield poor efficiency. This effect is caused in particular by internal friction of the motor's components and by internal motor leakage.

The problem of the admixing system not achieving the desired admixture rate occurs with admixing systems for fire extinguishing systems of the above-described structure when the fire to be extinguished only necessitates an extinguishing water flow at a low flow rate as a result of the unreliable operation of the water motor at such a low flow rate.

This can be countered by branching off a portion of the extinguishing water flow behind (i.e. downstream of) the motor and not deploying it onto the fire to be extinguished. The flow rate of the extinguishing water flow driving the motor is then greater than the flow rate of the extinguishing water flow to which the extinguishing agent additive is added and which is then spread onto the fire to be fought as a premix or as extinguishing foam respectively. The difference between the two cited flow rates is just the rate of flow of the branched-off portion of the extinguishing water flow.

The flow of extinguishing water which drives the motor is thus artificially increased and the operational range of the motor thereby increased to a range in which the motor works reliably (so-called start-up flow reduction).

Appropriately selecting the rate of flow of the branched-off portion of the extinguishing water flow thus enables the motor to always be operated at or above a minimum extinguishing water flow rate as required for its reliable operation.

Should the extinguishing water be provided from an extinguishing water tank, the branched-off portion of the extinguishing water flow can be returned to the extinguishing water tank; i.e. the branched-off portion of the extinguishing water flow circulates in the fire extinguishing system and is thus not lost.

The branching off occurs at a branching point ahead of (i.e. upstream) the admixture point at which the extinguishing agent additive, particularly a foaming agent, is mixed with the water. Doing so prevents the branched-off portion of the extinguishing water flow from already containing extinguishing agent additive at this point which might otherwise end up in the extinguishing water tank during the recirculation and could potentially result in undesired frothing there.

In the applicant's admixing systems, the branching off of a portion of the extinguishing water flow when the admixing system is started is triggered by a branching valve opening in a branching line running from the branching point upon the triggering of an alarm valve within the fire extinguishing system yet external of the admixing system itself. As soon as the extinguishing agent flow required by the load of the fire extinguishing system exceeds a certain value (for example 500 l/min), the start-up flow reduction is no longer needed and the branching valve is closed again. The loss of pressure created by the admixing system is thereby transmitted in the form of a differential pressure between two control lines to a differential pressure-controlled control valve which closes at a corresponding differential pressure.

Yet a start-up flow reduction control designed in this way has several disadvantages: On the one hand, providing an alarm valve external of the admixing system leads to potentially increased susceptibility to errors since the future functionality of the admixing system can then not be tested prior to delivery, particularly during final inspection at the factory. On the other hand, the differential pressure required for the control cannot always be determined with sufficient reliability. Both problems therefore lead to reduced admixing system operational reliability.

The invention is therefore based on the task of increasing operational reliability in an admixing system for fire extinguishing systems of the above-described structure.

This task is solved by an admixing system according to claim 1 as well as by a method for its operation according to claim 9. Advantageous further developments of the invention constitute the subject matter of the subclaims.

The invention is based on an admixing system for fire extinguishing systems for admixing an extinguishing agent additive, in particular a foaming agent, to an extinguishing agent, in particular water.

The admixing system has a motor, in particular a water motor, able to be driven by a flow of extinguishing agent, which has an inlet for supplying the extinguishing agent to the motor, in particular from an extinguishing agent tank or from an extinguishing agent supply line, an outlet for discharging the extinguishing agent from the motor, and an output shaft able to be driven by the motor.

The admixing system further comprises an admixing pump, in particular a piston pump, for conveying the extinguishing agent additive onward which has an input shaft coupled to the output shaft of the motor, an input for providing the extinguishing agent additive, in particular from an extinguishing agent additive tank or from an extinguishing agent additive supply line, and an output for discharging the extinguishing agent additive.

The admixing system further comprises an admixing line having a first motor-side end and a second outlet-side end, wherein the motor-side end is fluidly connected to the outlet of the motor.

In addition, the admixing system comprises an extinguishing agent additive line having a first pump-side end and a second admixing line-side end, wherein the pump-side end is fluidly connected to the output of the admixing pump and the admixing line-side end is fluidly connected to the admixing line at an admixture point which is different from the motor-side end of the admixing line.

The admixing system furthermore comprises a branching line with a first, admixing line-side end and a second, outlet-side end, wherein the admixing line-side end is fluidly connected to the admixing line at a branching point located between the motor-side end of the admixing line and the admixture point.

Lastly, the admixing system comprises a branching valve arranged in the branching line.

According to the invention, the admixing system additionally comprises a motor rotational speed measuring device and a controller. The controller is designed to fully or partially open and/or close the branching valve on the basis of the rotational speed of the motor measured by the motor rotational speed measuring device.

A measurement of the motor's rotational speed reflects the state of the admixing system, and in particular the motor, more precisely and reliably than for example the previously used differential pressure measurement. Nor are any components required to be arranged external of the admixing system such as the previously used alarm valve such that the entire admixing system can be tested prior to delivery regardless of any subsequently added external components. Doing so increases the operational reliability of the admixing system and solves the underlying task.

In one preferential embodiment of the invention, the controller is configured to fully open the branching valve when the branching valve is closed and the motor's rotational speed is greater than zero and below a first predefined rotational speed. Motor start-up is in this way detected and the branching off of a portion of the extinguishing agent flow activated. The first predefined speed can thereby indicate a motor rotational speed above which branching is not required or desired.

In a further preferential embodiment of the invention, the controller is configured to fully close the branching valve when the branching valve is open and the motor's rotational speed is above a second predefined rotational speed. The branching off can in this way be disabled. The second predefined speed can thereby in turn indicate a motor rotational speed above which branching is not required or desired.

In a further preferential embodiment of the invention, the controller is configured to partially open and/or close the branching valve as a function of the motor's measured rotational speed thus far that the sum of the flow rate of the extinguishing agent flow in the branching line and the flow rate of the extinguishing agent flow on the outlet-side end of the admixing line substantially corresponds to the flow rate of an extinguishing agent flow driving the motor at a third predefined rotational speed. This thereby enables even more precise regulating of the branched-off portion of the extinguishing agent flow than when the branching valve is only fully opened or closed. The third predefined rotational speed can thereby indicate a motor rotational speed at which branching off is only just barely necessary or desired. In this case, the branched-off portion of the extinguishing agent flow is just enough for the third predefined speed to be reached. In other words, the branched-off portion of the extinguishing agent flow is just as great as necessary, yet as little as possible.

In further preferential embodiments of the invention, the first, second or respectively third predefined rotational speed is selected such that the motor's rotational speed in the range of the respective predefined rotational speed is substantially proportional to the flow rate of the extinguishing agent flow driving the motor. Such a proportionality ensures that the output capacity of the admixing pump, its input shaft being coupled to the output shaft of the motor, is also proportional to said flow rate. This thereby ensures a substantially constant admixture rate for the extinguishing agent additive.

In a further preferential embodiment of the invention, the extinguishing agent flow can be discharged into the admixing system's surroundings at the outlet-side end of the branching line. This possibility of discharging the branched-off portion of the extinguishing agent flow is particularly advantageous when the extinguishing agent is not provided from an extinguishing agent tank but rather from an extinguishing agent supply line, in particular a pressurized one. In this case, it would be technically difficult to feed the branched-off extinguishing agent back into the extinguishing agent supply line again. Particularly in the case of water as the extinguishing agent (which at the time of being branched off does not yet contain an extinguishing agent additive), discharging into the admixing system's surroundings is also unproblematic from an environmental perspective.

The invention further relates to a method for operating an admixing system according to the invention having the following steps:

- directing a flow of extinguishing agent to the inlet of the motor,
- driving the motor via the flow of extinguishing agent,
- driving the output shaft of the motor via the motor,
- discharging the extinguishing agent from the outlet of the motor into the admixing line,
- branching off a portion of the extinguishing agent from the admixing line into the branching line at the branching point if the branching valve is fully or partially open,
- discharging the branched-off portion of the extinguishing agent at the outlet-side end of the branching line,
- driving the input shaft of the admixing pump via the output shaft of the motor,
- driving the admixing pump via its input shaft,
- providing the extinguishing agent additive at the input of the admixing pump,
- supplying the extinguishing agent additive through the admixing pump,
- discharging the extinguishing agent additive from the output of the admixing pump into the extinguishing agent additive line,
- admixing the extinguishing agent additive into the extinguishing agent in the admixing line at the admixture point,
- dispensing the extinguishing agent/extinguishing agent additive mixture (premix) at the outlet-side end of the admixing line,
- measuring the rotational speed of the motor via the motor rotational speed measuring device,
- fully and/or partially opening and/or closing the branching valve via the controller as a function of the motor's measured rotational speed.

Further advantages, features and possible applications of the present invention will become apparent from the following description in conjunction with the figure. Thereby shown is:

FIG. 1: a flowchart of an admixing system according to the invention including additional components of a fire extinguishing system.

The admixing system 1 is supplied with extinguishing water from an extinguishing water tank 23, the fill level of which can be monitored via a float 47. The extinguishing water is pumped out of the extinguishing water tank 23 by an extinguishing water pump 27, which is driven by a motor 29 via clutch 28, and in doing so filtered through a filter 32. A respective check valve 30, 31 is in each case arranged ahead of the extinguishing water pump 27 and behind the filter 32.

In this way, the extinguishing water is pressurized prior to being fed to the water motor 2 and driving same. The water motor 2 preferably works according to the displacement principle, further preferably according to the reciprocating piston or rotational principle.

The extinguishing water reaches the motor-side end 11 of the admixing line 10 at the outlet 4 of the water motor 2 and is directed from there through the admixing line 10 to its outlet-side end 12 to which are connected the load(s) of the fire extinguishing system such as one or more sprinkler nozzles or a foaming nozzle and firefighting monitor (none of which are shown).

The output shaft 5 of the water motor 2 is connected to the input shaft 9 of the admixing pump 6 via a clutch 25. The input shaft 9 of the admixing pump 6 is thus also set into rotational motion with the output shaft 5 of the water motor 2 and in turn drives the admixing pump 6. The admixing pump 6 preferably a plunger pump or an adjustable plunger pump.

The admixing pump 6 pumps an extinguishing agent additive, in particular a foaming agent provided in the extinguishing agent additive tank 24, its fill level likewise being able to be monitored via a float 42. Passing through a stopcock valve 40 and a non-return flap 41, the extinguishing agent additive first reaches a 3-way ball valve 44, the function of which will be discussed below, and in the corresponding "Suction" position of the 3-way ball valve 44, input 7 of the admixing pump 6 where it is drawn in by the admixing pump 6, pressurized by same, and conveyed to the output 8 of the admixing pump 6.

The extinguishing agent additive reaches the pump-side end 14 of extinguishing agent additive line 13 at the output 8 of admixing pump 6. The admixing pump 6 and the extinguishing agent additive line 13 can be vented via a bleeder valve 51. The pressure of the extinguishing agent additive in extinguishing agent additive line 13 can be monitored via a manometer 45.

In extinguishing agent additive line 13, the extinguishing agent additive first reaches a 3-way ball valve 34, the function of which will also be described below, and in the corresponding "Admixture" position of the 3-way ball valve 34, the admixing line-side end 15 of the extinguishing agent additive line 13 where it connects to admixing line 10. This is also the location of admixture point 16, at which the extinguishing agent additive is added to the extinguishing water.

By synchronizing the flow rates of the extinguishing water flow in admixing line 10 and the extinguishing agent additive flow in extinguishing agent additive line 13, the volumetric ratio between the admixed extinguishing agent additive and extinguishing water; i.e. the admixture rate, is substantially constant, for example 3%, due to the coupling of the water motor 2 to the admixing pump 6.

A non-return flap 33 arranged ahead (i.e. upstream) of the admixture point 16 in extinguishing agent additive line 13 prevents extinguishing water from being able to enter the extinguishing agent additive line 13 in the direction of the admixing pump 6. Correspondingly, a non-return flap 33 arranged ahead (i.e. upstream) of the admixture point 16 in admixing line 10 prevents extinguishing agent additive from being able to enter into admixing line 10 in the direction of the water motor 2.

In addition to the two positions described above, the 3-way ball valves 34, 44 can each be brought into a further position in order to initiate an additional function of the admixing system 1:

In the further "Return" position of the 3-way ball valve 34, the extinguishing agent additive from extinguishing agent additive line 13 is not directed to the admixture point 16 but rather, via a return line 35 and a counterpressure valve 37, to an extinguishing agent additive measuring tank 36, the fill level of which can be monitored by a float 38. A pressure relief valve 52 having a greater opening pressure than that of the counterpressure valve 37 is provided ahead (i.e. upstream) of the 3-way ball valve 34 in a further line between the extinguishing agent additive line 13 and the extinguishing agent additive measuring tank 36.

Doing so enables measuring the volume of the extinguishing agent additive conveyed by the admixing pump 6 over a specific interval of time and comparing it to the—e.g. calculated—volume of extinguishing water flowing through the water motor 2 during the same time interval. This enables monitoring adherence to the desired admixture rate.

The return of the extinguishing agent additive into extinguishing agent additive measuring tank 36 allows the described control measurement to be performed without the extinguishing agent additive actually needing to be mixed with the extinguishing water. The extinguishing agent additive collected in the extinguishing agent additive measuring tank 36 can then be returned to the extinguishing agent additive tank 24 again via a stopcock valve 39 and is thus not lost due to the control measurement.

In the further "Flushing" position of the 3-way ball valve 44, a portion of the extinguishing water is already branched off ahead of (i.e. upstream) the water motor 2 and directed into the admixing pump 6 in order to flush it. The extinguishing water used to flush the admixing pump 6 then, as described above for the extinguishing agent additive, flows through extinguishing agent additive line 13 back into the admixing line 10 at admixture point 16. The admixing pump 6 can in this way be flushed with extinguishing water such that no separate reservoir of flushing water needs to be provided for the purpose.

Instead of providing ball valve 44, the three lines which are connected to the ball valve 44 can, alternatively, also be directly connected together in a fluid-conducting manner (similar as at admixture point 16). Instead of the ball valve 44, a stopcock valve and a non-return flap are then preferably arranged in the line coming from the extinguishing water pump 27 and branched off ahead of the water motor 2 (not depicted).

The open stopcock valve then corresponds to the "Flushing" position of the 3-way ball valve 44, whereby the branched-off portion of the extinguishing water is directed into the mixing pump 6 in order to flush it, and the closed stopcock valve corresponds to the above-described "Suction" position of the 3-way ball valve 44. The non-return flap prevents the extinguishing agent additive from entering into the line coming from the extinguishing water pump 27, and from there the water motor 2. Conversely, the non-return flap 41 prevents extinguishing water from entering into the extinguishing agent additive tank 24.

If the load—for example a sprinkler system in which only one or just a few sprinklers are open—only requires a small flow of extinguishing agent at the outlet-side end 12 of the admixing line 10, only a correspondingly low rotational speed of the water motor 12 is likewise required. In order to circumvent the unreliability of the water motor 2 and its poor efficiency at low rotational speeds, a portion of the extinguishing water flow is branched off from the admixing line 10 via a branching line 17 and the flow of extinguishing water through the water motor 2 thereby artificially increased. The branched-off portion of the extinguishing water flow is then returned to the extinguishing water tank 23 and is thus not lost.

The admixing line-side end 18 of the branching line 17 is located at a branching point 20 in the admixing line 10 and the outlet-side end 19 of the branching line 17 is connected to the extinguishing water tank 23. The branching point 20 being located on the admixing line 10 ahead of (i.e. upstream) the non-return flap 43 and admixture point 16 ensures that only extinguishing water, albeit no extinguishing agent additive or premix, enters the branching line 17 and from there ends up back in extinguishing water tank 23.

The branching line 17 can be opened and closed by a controllable branching valve 21. A slide valve 49, a pressure reducer 50, another slide valve 48 and a gate 26 are arranged on the branching line 17 after (i.e. downstream of) branching valve 21. The pressure on the branching line 17 can be monitored by a manometer 46.

The branching line 17 serves to reduce start-up flow; i.e. ensure reliable operation of the water motor 2 even with low flows of extinguishing agent being required at the outlet-side end 12 of the admixing line 10, by the circulation of an additional branched-off flow of extinguishing water through the water motor 2. This thereby enables being able to decrease the minimum flow of extinguishing agent as of which the required admixture rate is reliably achieved, for example from 200 l/min to 60-80 l/min, thus to about a third. The motor speed associated with this minimum extinguishing agent flow is referred to in the following as $U_{min}$.

The start-up flow reduction is controlled by a controller (not depicted) of the admixing system 1. Same is connected to a motor rotational speed measuring device 22 which continuously measures the rotational speed of the water motor 2. The motor rotational speed measuring device 22 can for example be a proximity switch attached to the clutch 25 which receives a pulse from a magnetic pulse generator attached to one of the shafts 5, 9 upon each revolution of the shafts 5, 9. From that, the proximity switch itself or the controller then determines the rotational speed of the water motor 2.

The controller is furthermore connected to the branching valve 21 and can open and close it via the corresponding signals. The example embodiment only provides signals for the full opening/full closing of the branching valve 21. It is, however, also possible to output signals for only a partial opening/partial closing of the branching valve 21, provided this has the appropriate efficiency.

Preferably, the controller opens branching valve 21 as soon as the motor rotational speed measuring device 22 detects a motor speed greater than 0 but less than $U_{min}$. In this range of rotational speed, the water motor 2 has already started up; i.e. the admixing system 1 is in operation, although the required flow of extinguishing agent is lower than needed for reliable operation of the water motor 2. Therefore, by opening the branching valve 21, a portion of the extinguishing water flow flowing through the water motor 2 is branched off into branching line 10 for the purpose of start-up flow reduction.

Accordingly, the controller closes the branching valve 21 as soon as the motor rotational speed measuring device 22 detects a motor speed greater than $U_{min}$.

The water motor 2 then runs in a rotational speed range which guarantees its reliable operation. Start-up flow reduction is thus not necessary and the branching can be disabled by closing branching valve 21.

LIST OF REFERENCE NUMERALS

1 admixing system
2 water motor
3 water motor inlet
4 water motor outlet
5 water motor output shaft
6 admixing pump
7 admixing pump input
8 admixing pump output
9 admixing pump input shaft
10 admixing line
11 motor-side end of admixing line
12 outlet-side end of admixing line
13 extinguishing agent additive line
14 pump-side end of extinguishing agent additive line
15 admixing line-side end of extinguishing agent additive line
16 admixture point
17 branching line
18 admixing line-side end of the branching line
19 outlet-side end of the branching line
20 branching point
21 branching valve
22 motor rotational speed measuring device
23 extinguishing water tank
24 extinguishing agent additive tank
25 clutch
26 gate
27 extinguishing water pump
28 extinguishing water pump clutch
29 extinguishing water pump motor
30 check valve
31 check valve
32 filter
33 non-return flap
34 3-way "Admixture/Return" ball valve
35 return line
36 extinguishing agent additive measuring tank
37 counterpressure valve
38 float
39 stopcock valve
40 stopcock valve
41 non-return flap
42 float
43 non-return flap
44 3-way "Flushing/Suction" ball valve
45 manometer
46 manometer
47 float
48 slide valve
49 slide valve
50 pressure reducer
51 bleeder valve
52 bleeder valve

The invention claimed is:

1. An admixing system for fire extinguishing systems for producing an extinguishing agent/extinguishing agent additive mixture (premix) by admixing an extinguishing agent additive to an extinguishing agent comprising:

a motor able to be driven by a flow of the extinguishing agent which has an inlet for supplying the extinguishing agent to the motor and an outlet for discharging the extinguishing agent from the motor, and an output shaft able to be driven by the motor;

an admixing pump for conveying the extinguishing agent additive which has an input shaft coupled to the output shaft of the motor, an input for providing the extinguishing agent additive and an output for discharging the extinguishing agent additive;

an admixing line having a first motor-side end and a second outlet-side end, wherein the first motor-side end is fluidly connected to the outlet of the motor;

an extinguishing agent additive line having a first pump-side end and a second admixing line-side end, wherein the first pump-side end is fluidly connected to the output of the admixing pump and the second admixing line-side end is fluidly connected to the admixing line at an admixture point, which is different from the first motor-side end of the admixing line;

a branching line with a first admixing line-side end and a second outlet-side end, wherein the first admixing line-side end is fluidly connected to the admixing line at a branching point located between the first motor-side end of the admixing line and the admixture point;

a branching valve arranged in the branching line;

a motor rotational speed measuring device; and a controller designed to fully or partially open and/or close the branching valve on the basis of a rotational speed of the motor measured by the motor rotational speed measuring device.

2. The admixing system according to claim 1, wherein the controller is configured to fully open the branching valve when the branching valve is closed and the rotational speed of the motor is greater than zero and below a first predefined rotational speed (Umin).

3. The admixing system according to claim 2, wherein the rotational speed of the motor in the range of the first predefined rotational speed (Umin) is substantially proportional to a flow rate of the flow of the extinguishing agent driving the motor.

4. The admixing system according to claim 1, wherein the controller is configured to fully close the branching valve when the branching valve is open and the rotational speed of the motor is above a second predefined rotational speed (Umin).

5. The admixing system according to claim 4, wherein the rotational speed of the motor in the range of the second predefined rotational speed (Umin) is substantially proportional to a flow rate of the flow of the extinguishing agent driving the motor.

6. The admixing system according to claim 1, wherein the controller is configured to partially open or close the branching valve as a function of a measured rotational speed of the motor thus far that a sum of a flow rate of the flow of the extinguishing agent in the branching line and a flow rate of the flow of the extinguishing agent on the second outlet-side end of the admixing line substantially corresponds to a flow rate of the flow of the extinguishing agent driving the motor at a third predefined rotational speed (Umin).

7. The admixing system according to claim 6, wherein the rotational speed of the motor in the range of the third predefined rotational speed (Umin) is substantially proportional to a flow rate of the flow of the extinguishing agent driving the motor.

8. The admixing system according to claim 1, wherein the flow of the extinguishing agent can be discharged into the surroundings of the admixing system at the second outlet-side end of the branching line.

9. A method for operating an admixing system according to claim 1 having the following steps:

directing the flow of the extinguishing agent to the inlet of the motor;

driving the motor via the flow of the extinguishing agent;

driving the output shaft of the motor via the motor;

discharging the extinguishing agent from the outlet of the motor into the admixing line;

branching off a portion of the extinguishing agent from the admixing line into the branching line at the branching point when the branching valve is fully or partially open;

discharging the branched-off portion of the extinguishing agent at the second outlet-side end of the branching line;

driving the input shaft of the admixing pump via the output shaft of the motor;

driving the admixing pump via its input shaft;

providing the extinguishing agent additive at the input of the admixing pump;

pumping the extinguishing agent additive via the admixing pump;

discharging the extinguishing agent additive from the output of the admixing pump into the extinguishing agent additive line;

admixing the extinguishing agent additive into the extinguishing agent in the admixing line at the admixture point;

dispensing the extinguishing agent/extinguishing agent additive mixture (premix) at the second outlet-side end of the admixing line;

measuring the rotational speed of the motor via the motor rotational speed measuring device; and fully opening, partially opening, or closing the branching valve via the controller as a function of a measured rotational speed of the motor.

* * * * *